Patented June 9, 1931

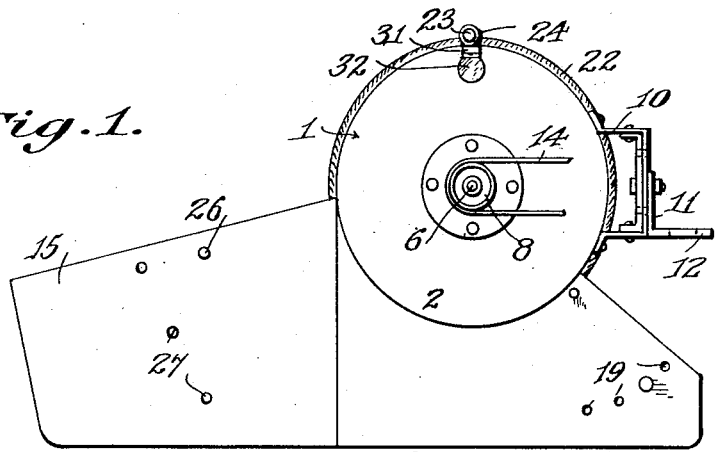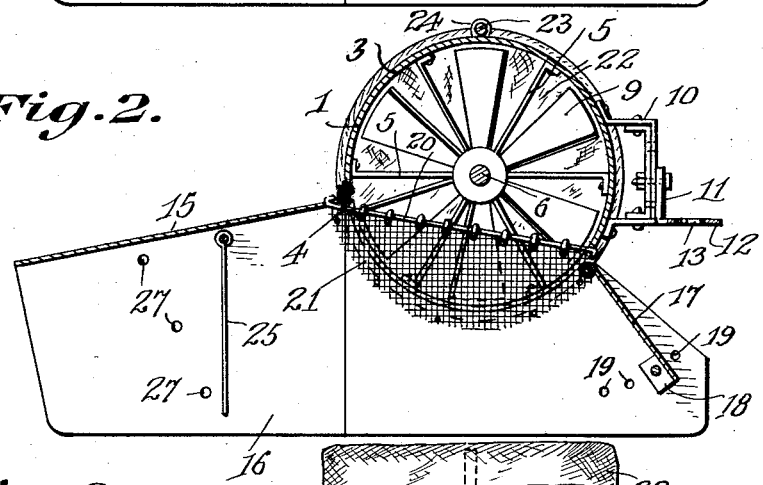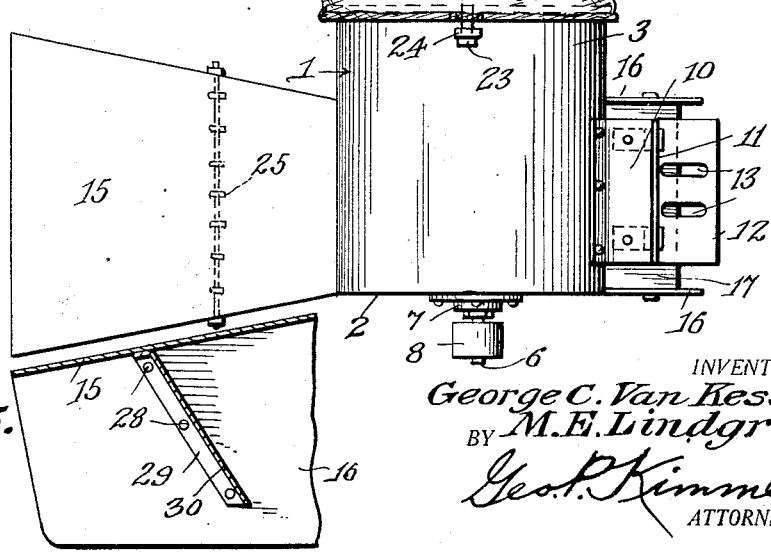

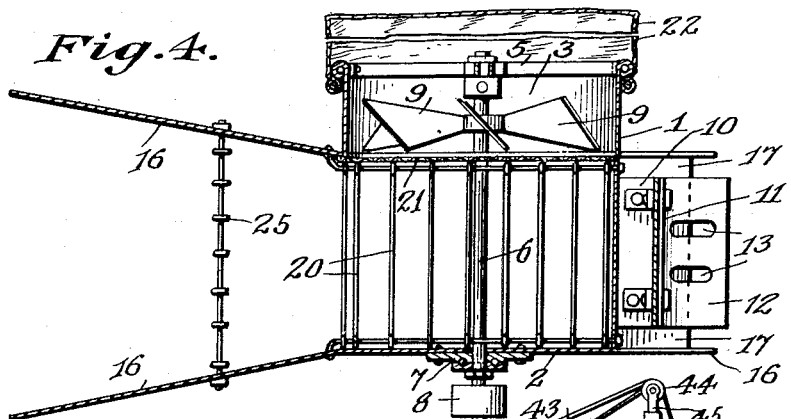
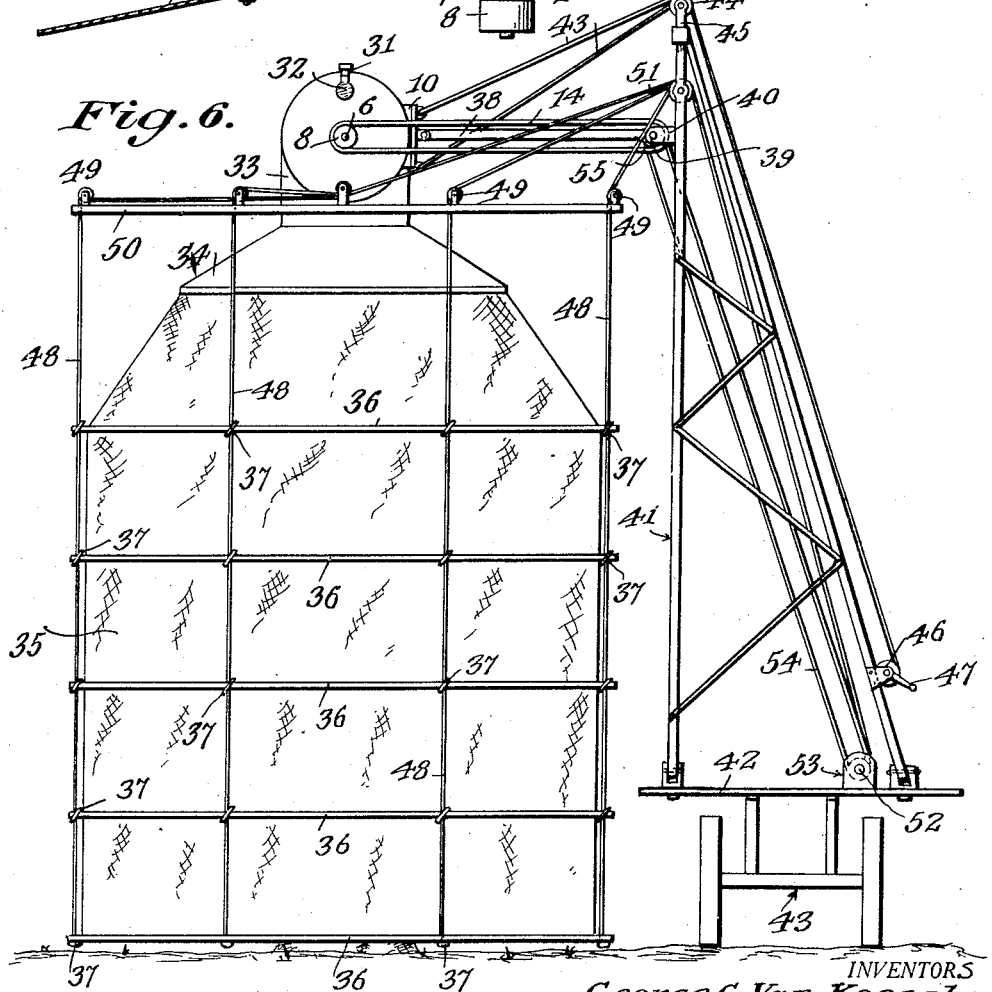

1,809,766

UNITED STATES PATENT OFFICE

GEORGE C. VAN KESSEL, OF OPA LOCKA, AND MAURICE E. LINDGREN, OF MIAMI, FLORIDA, ASSIGNORS TO INTERNATIONAL INSECT DESTROYER MANUFACTURING COMPANY, A CORPORATION OF FLORIDA

INSECT CATCHER

Application filed April 14, 1930. Serial No. 444,231.

This invention relates to an insect catcher and has for its primary object to provide, in a manner as hereinafter set forth, a device of such class which is adapted for connection with a cultivating implement for movement across a field in advance of the implement, by means of which insects may be expeditiously removed from the plant being cultivated without injury to the plant.

A further object of the invention is to provide an insect catcher which is adapted to be mounted on a movable crane in order that the device may be utilized for removing insects from fruit trees.

A further object of the invention is to provide a device of the character aforesaid which may be utilized after dark for catching flies, mosquitoes and the like.

With the foregoing and other objects in view, the invention consists of the novel construction, combination and arrangement of parts as hereinafter more particularly described, and as illustrated in the accompanying drawings wherein are shown practical embodiments of the invention, but it is to be understood that the description and drawings are to be taken as illustrative and that the invention is intended to be limited only by the scope of the claims hereunto appended.

In the accompanying drawings in which like numerals are employed to designate like parts throughout the several views:—

Figure 1 is a side elevation of an insect catcher in accordance with this invention.

Figure 2 is a vertical section therethrough.

Figure 3 is a top plan thereof.

Figure 4 is a horizontal section therethrough.

Figure 5 is a fragmentary section showing the detachable windshield for the hood.

Figure 6 is an elevation of a slightly modified form of the invention particularly adapted for use in removing insects from fruit trees.

Referring to the drawings in detail, the numeral 1 indicates a cylindrical housing formed with a closed end 2 and an open end 3. From the closed end 2 to a line in spaced relation to the open end 3, the peripheral wall of the housing 1 is provided with a cutout portion 4 extending throughout an arc of substantially 120°. Extending across the open end 3 is a spider 5, within the hub of which is journaled one end of a shaft 6 which extends through the housing and is journaled adjacent its opposite end in a bearing 7 secured to the outer face of the closed end 2. Outwardly of the bearing 7, the shaft 6 is provided with a pulley 8, and between the recess 4 and spider 5, the shaft 6 is provided with a fan 9.

Secured to the peripheral wall of the housing 1, adjacent the rearward end of the recess 4, is a bracket 10 to which is secured for vertical adjustment a vertically disposed leg 11 of a substantially L-shaped coupling element having a horizontally disposed leg 12 adapted for connection to the forward end of a cultivating implement, not shown. The horizontally disposed leg 12 is formed with elongated slots 13 to provide for the adjustment of the device toward and from the implement with which it is connected in order to properly tension a belt 14 which passes over the pulley 8 for driving the shaft 6, and which is adapted to be driven from the implement with which the device is connected.

Depending from the housing 1 is a hood which includes a forward top wall 15 having a pair of side walls 16 formed integrally therewith. The wall 15 extends from a point adjacent the forward end of the recess 4 at a downward and forward inclination and gradually increases in width in a forward direction. The side walls 16 extend from the forward end of the top wall 15 to a line disposed a material distance rearwardly of the housing, and are formed in their upper faces with arcuate recesses for the reception therein of that portion of the housing formed with the recess 4. The hood is provided at its rearward end with a tail gate 17, the upper end of which is pivotally secured to the side walls 16, and the lower end of which is provided with apertured ears, such as 18, for selective registration with a row of openings 19 formed in each of the side walls 16, in order that suitable pins may be inserted through the registering openings for adjustably securing the lower end of the tail gate in position.

Extending across the recess 4 is a grate 20, the forward end of which is secured to the wall 15, and the rearward end of which is secured to the housing 1. Extending across the end of the recess 4 adjacent the fan 9 is a screen 21. Secured to the open end 3 of the housing is the open end of a flexible bag 22, which is maintained in horizontal position by means of a supporting rod 23 to which the bag 22 is connected, and which is connected to the peripheral wall of the housing 1 by suitable straps 24. Disposed within the hood, forwardly of the housing 1, is an agitator 25, the upper end of which is rotatably mounted in openings 26 formed in the side walls 16. Forwardly of the agitator 25, each of the side walls 16 is formed with a forwardly and upwardly inclined row of openings 27 for registration with openings 28 in side flanges 29 of a windshield 30 extending transversely across the hood. By passing suitable pins through the registering openings 28 and 27, the windshield 30 may be detachably secured in position. The use or non-use of the windshield 30 depends upon the nature of the insect which it is desired to catch. The peripheral wall of the housing 1 is provided with a light socket 31 for the reception of a globe 32 to provide an attraction for insects when it is desired to use the catcher after dark for catching flies, mosquitoes and the like.

In the embodiment shown in Figure 6, the hood depending from the housing consists of a rectangular body portion 33 recessed at its upper edge for the reception of a peripheral portion of the housing therein, and merging at its lower end in a downwardly and outwardly flared apron 34. The lower end of the apron 34 is preferably of circular formation and secured thereto is a flexible skirt 35, preferably formed of cloth, and having an upper portion thereof tapered for connection with the apron. Encircling the skirt 35, and secured thereto, are a plurality of hoops 36, each of which is provided with a plurality of spaced loops 37.

The bracket 10 secured to the peripheral wall of the housing is fixedly secured to the outer end of a beam 38, the inner end of which is pivotally mounted on a shaft 39 journaled in a pair of brackets, such as 40, projecting from a crane 41 having its lower end pivotally connected to a platform 42 mounted on a truck 43. The beam 38 is maintained in a horizontal position by means of a pair of guy ropes 43 which are secured to the bracket 10 and which pass over a pulley 44 mounted on the upper end of an extension 45 for the crane 41. The guy ropes 43 further pass over a windlass 46 mounted on the crane 41 and provided with a suitable crank 47.

Secured to each of the loops 37 on the lowermost hoop 36 is a skirt hoisting rope 48 which extends upwardly and passes through a loop 37 in each of the remaining hoops 36. The ropes 48 pass over pulleys 49 mounted on a guide rail 50 encircling and suitably secured to the body portion 33, then pass over a pulley on the shaft 39 to provide for the the upper end of the latter. The ropes 48 pass from the pulley 51 to the drive shaft 52 of a motor indicated conventionally at 53 and mounted on the platform 42. Actuated by the shaft 52 is a belt 54 which passes over a pulley on the shaft 39 to provide for the rotation of the latter. Fixedly mounted on the shaft 39 is a similar pulley 55 for actuating the belt 14 which drives the pulley 8. The shaft 52 is provided with a suitable clutch, not shown, in order that the shaft may be selectively utilized for driving the pulley 8, or for hoisting the hoops 36. The pivotal mounting of the crane 41 on the platform 42 permits the crane to be lowered to a horizontal position in order to facilitate movement of the device over highways. The crane may be raised and lowered when desired by means of a suitable hoisting line, not shown, attached to the upper end of the crane.

In the use of the device for catching insects of a character which infest the leaves of plants, the device is moved across the field of plants with the side walls 16 of the hood straddling a row of plants. The height of the housing is adjusted so that the agitator 25 will brush against the plants as the device is moved along the row in order to dislodge the insects from the leaves of the plants and cause the insects to be sucked into the bag 22 by the suction created by the fan 9. After passing through the recess 4, the insects are prevented from escaping from the housing by means of the screen 21. In the event of the device being used in connection with relatively tall plants, the tops of the plants are protected from the fan by the grate 20.

When the device is being used for catching insects which remain on the ground, or close to the ground, such as the squash beetle, the detachable windshield 30 is secured in place in order to shut off the entrance of air through the forward end of the hood, thereby providing a greater suction beneath the housing for lifting the insects thereinto. Owing to the enormous suction which is created when the windshield is used, fine particles of dirt and sand may be lifted with the insects, therefore the bag 22 will preferably be formed of a fine mesh when the device is used with the windshield 30 attached thereto.

The embodiment shown in Figure 6 is particularly adapted for use for catching insects of the variety of the Mediterranean fruit fly. The skirt 35 prevents the escape of the insects, and the suction from the fan will remove all of the insects from a tree in approximately one minute. After the tree has been cleaned, the skirt may be lifted by means of the ropes 48, after which the truck 43 may be readily moved to the next tree.

It is thought the many advantages of an insect catcher in accordance with this invention will be readily apparent, and although the device will preferably be constructed in accordance with the embodiments herein illustrated and described, it is to be understood that changes in the details of construction may be resorted to, so long as such changes fall within the scope of the invention as defined in the appended claims.

What we claim is:

1. An insect catcher comprising, a cylindrical housing having a closed end and an open end and formed in its peripheral wall with a circumferentially extending recess in spaced relation to said open end, a rotatable shaft extending through the housing, a fan fixedly mounted on the shaft between said recess and the open end of the housing, a flexible bag secured to the open end of the housing, and a hood depending from the housing in registry with said recess.

2. An insect catcher comprising, a cylindrical housing having a closed end and an open end and formed in its peripheral wall with a circumferentially extending recess in spaced relation to said open end, a rotatable shaft extending through the housing, a fan fixedly mounted on the shaft between said recess and the open end of the housing, a flexible bag secured to the open end of the housing, a hood depending from the housing in registry with said recess, and a grate extending across said recess adjacent the upper edge of said hood.

3. An insect catcher comprising, a cylindrical housing having a closed end and an open end and formed in its peripheral wall with a circumferentially extending recess in spaced relation to said open end, a rotatable shaft extending through the housing, a fan fixedly mounted on the shaft between said recess and the open end of the housing, a flexible bag secured to the open end of the housing, a hood depending from the housing in registry with said recess, and a screen extending transversely across the housing adjacent one side of said recess.

4. An insect catcher comprising, a cylindrical housing having a closed end and an open end and formed in its peripheral wall with a circumferentially extending recess in spaced relation to said open end, a rotatable shaft extending through the housing, a fan fixedly mounted on the shaft between said recess and the open end of the housing, a flexible bag secured to the open end of the housing, and a swinging agitator disposed within the hood forwardly of said housing.

5. An insect catcher comprising, a cylindrical housing having a closed end and an open end and formed in its peripheral wall with a circumferentially extending recess in spaced relation to said open end, a rotatable shaft extending through the housing, a fan fixedly mounted on the shaft between said recess and the open end of the housing, a flexible bag secured to the open end of the housing, a hood depending from the housing in registry with said recess, and a detachable windshield secured within the hood forwardly of the housing.

6. An insect catcher comprising, a cylindrical housing having a closed end and an open end and formed in its peripheral wall with a circumferentially extending recess in spaced relation to said open end, a rotatable shaft extending through the housing, a fan fixedly mounted on the shaft between said recess and the open end of the housing, a flexible bag secured to the open end of the housing, a hood depending from the housing in registry with said recess, and a foldable, flexible skirt depending from the hood.

7. An insect catcher comprising, a cylindrical housing having a closed end and an open end and formed in its peripheral wall with a circumferentially extending recess in spaced relation to said open end, a rotatable shaft extending through the housing, a fan fixedly mounted on the shaft between said recess and the open end of the housing, a flexible bag secured to the open end of the housing, a hood depending from the housing in registry with said recess, and vertically adjustable means for supporting the housing.

In testimony whereof, we affix our signatures hereto.

GEORGE C. VAN KESSEL.
MAURICE E. LINDGREN.